Feb. 7, 1950      M. D. FISKE      2,496,865
ELECTRONIC DISCHARGE DEVICE
Filed May 7, 1946
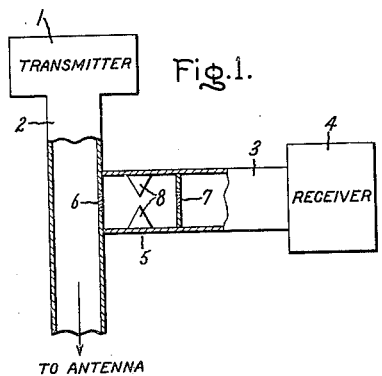
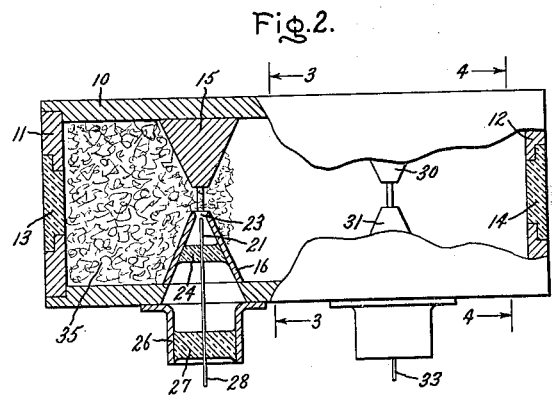
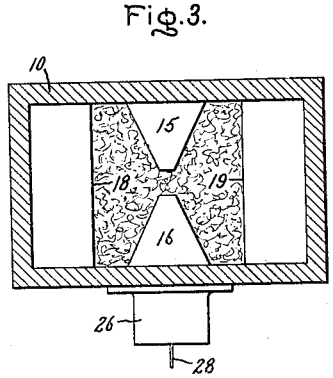
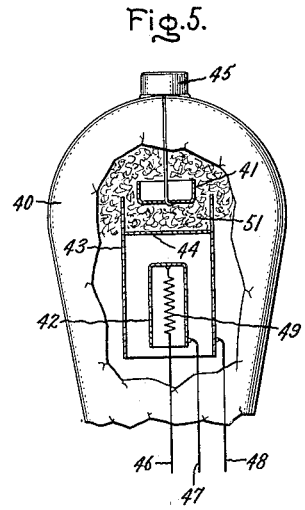
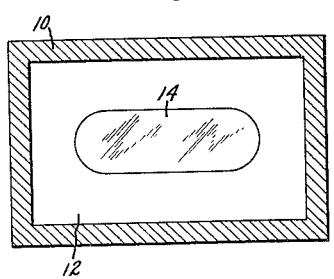
Inventor:
Milan D. Fiske,
by Harry E. Dunham
His Attorney.

Patented Feb. 7, 1950

2,496,865

UNITED STATES PATENT OFFICE 2,496,865

ELECTRONIC DISCHARGE DEVICE

Milan D. Fiske, Schenectady, N. Y., assignor to General Electric Company, a corporation of New York Application May 7, 1946, Serial No. 667,816

12 Claims. (Cl. 250—27.5)

The present invention relates to improvements in electronic devices of the type in which an ionizable gas is employed as a discharge medium.

In certain applications of such devices, it is important that after a period of conductivity, the device be restored to full non-conductivity in the shortest possible interval of time, an example of this being the use of a gaseous electronic switch (TR switch) in radar apparatus. However small such devices, a limitation is placed upon the speed with which full non-conductivity can be attained by the time required for deionization of the gaseous medium employed.

It is an object of my present invention to provide means for increasing the rate of deionization of the gases typically employed in discharge devices.

Stated in general terms, my invention makes use of a finely divided inert insulating material in free contact with the gas desired to be deionized for shortening its effective deionizing time. A particularly useful embodiment of the invention has been found to be fine filaments of siliceous material.

The features of the invention which I consider novel are pointed out with particularity in the appended claims. The invention itself, together with its further objects and advantages, may best be understood by reference to the following description in connection with the accompanying drawing in which Fig. 1 is a schematic representation useful in explaining the utility of one embodiment of the invention; Fig. 2 is a cross-sectional view of a device employing the invention; Fig. 3 is a section taken on line 3—3 of Fig. 2; Fig. 4 is a section taken on line 4—4 of Fig. 2; and Fig. 5 is a fragmentary view partially broken away, of an alternative embodiment of the invention.

Referring particularly to Fig. 1, there are shown schematically the basic elements of a radar transmitter-receiver system. This includes a transmitter 1 which may consist, for example, of a magnetron oscillator (not shown) and means for energizing the same in brief pulses. High frequency energy generated by the transmitter is conducted through a wave guide 2 to a radiating antenna (not shown). Returning signals intercepted by the same or a related antenna are transmitted back through the wave guide 2 and conducted through a second wave guide 3 to a receiver 4.

In order that the receiver 4 may not be damaged by the transmitted signal, which is inherently much greater in power level than the received signal, it is necessary that means be provided for interrupting communication between the wave guide 2 and the receiver during the transmitting interval. This is accomplished by interposing in the wave guide 3 an electronic switching device 5, ordinarily referred to as a TR (transmitter-receiver) switch. This switch, in those cases which are relevant to the present invention, consists of a sealed enclosure having dielectric windows 6 and 7 through which wave energy may pass and containing an ionizable gas adapted to support a discharge. Electrodes 8 are provided within the switch to facilitate commencement of a discharge. With this arrangement, establishment in the vicinity of the window 6 of the relatively intense electric fields which accompany the occurrence of a transmitting pulse immediately occasions the production of an ionizing discharge within the TR switch. As a consequence the entrance to the wave guide 3 is effectively short-circuited and passage of energy to the receiver is blocked.

In order that the returning signal may not also be denied access to the receiver, it is, of course imperative that the TR switch return to a non-conductive state within a matter of microseconds after termination of the transmitting pulse. The possibility of its doing this is, however, governed by the rate of deionization of the gas within the switch. One of the principal problems in the design of such switches, therefore, has been the matter of assuring an adequately short deionizing time. It is this problem to which my present invention is addressed, as will appear more clearly in the following discussion of Fig. 2 and the related figures.

In Fig. 2 there is shown an electronic TR switch similar in function to that described in connection with Fig. 1. The illustrated switch comprises an elongated metal enclosure 10 of rectangular cross-section (see Fig. 3) which is closed at its extremities by wall-forming members 11 and 12 which are hermetically joined to it. These wall members include dielectric (e. g., glass) windows 13 and 14 respectively which are sealed into the surrounding metal and which function in a manner to be specified more fully in the following. To permit a sealed junction to be formed between the windows 13 and 14 and the metal parts 11 and 12, the latter may be constituted of a metal adapted to seal to glass such, for example, as an alloy of nickel, iron and cobalt.

The sealed enclosure formed by the combination of the elements 10, 11 and 12 is filled with an ionizable gas such as argon or one of the other rare gases. Alternatively, it may contain a quantity of a readily vaporizable solid or a liquid such as mercury which, in its vaporized state, provides a monatomic ionizable gas.

At a point removed from the window 13 by a distance corresponding approximately to a quarter wave length at the intended operating frequency of the device, there are provided a pair of opposed electrodes 15 and 16 which, as externally viewed, are of frustro-conical outline. Within the casing 10 and parallel to the central transverse plane of the electrodes 15 and 16, there are provided metal screening members 18 and 19 (see Fig. 3) which limit the free aperture around the electrodes.

It is the function of the electrodes 15 and 16, in co-operation with the ionizable gas contained within the enclosure 10, to produce a discharge within the enclosure when favorable electric fields are present. To facilitate the occurrence of such a discharge, it is desirable that a source of preionized gas molecules be available, and for this reason there is provided in connection with the electrode 16 an auxiliary keep-alive electrode 21 which extends within the interior of the electrode 16 into proximity to an orifice 23 formed at its upper extremity. This keep-alive electrode is appropriately centered by means of an insulating (e. g., ceramic) spacer 24 which is affixed to the inner surface of the electrode 16 and through which the electrode 21 projects. In order that the lead-in connection of the electrode 21 may constitute a hermetic seal, there is provided a flanged eyelet 26 which may be hermetically joined to the outer surface of the part 10 and which contains a body of glass 27 fusion-sealed to the interior of the eyelet and to an outwardly extending portion 28 of the electrode 21. In the normal use of the device, a potential difference may be maintained between the electrode 21 and the relatively grounded electrode 16 so that a continuous discharge of low intensity occurs between their juxtaposed extremities, thus producing a continuous supply of ions in or near the space between electrodes 15 and 16.

With the arrangement so far specified, the occurrence near the dielectric window 13 of an electric field directed parallel to the narrow dimension of the window will, if the field is of sufficient intensity and of an appropriate frequency of recurrence, cause a corresponding field to exist within the enclosure 10 (i. e., by propagation through window 13). Under these circumstances, an ionizing discharge may be expected to occur between opposed surfaces within the enclosure 10 which are appropriately located with reference to the direction of the electric field. As a practical matter, with the configuration noted, assuming the field direction to be parallel to the shorter dimension of the enclosure 10, a discharge may be expected to occur across the inner surface of the window 13 (e. g., from the metal bounding the upper edge of the metal to that bounding the lower edge) and a secondary discharge will occur between the electrodes 15 and 16. As a result of the pre-existence of ions produced by the keep-alive arc maintained between electrode 16 and the auxiliary electrode 21, the discharges just referred to may be expected to attain full value very promptly upon occurrence of favorable field conditions. As a result of their occurrence, the TR switch may be considered to be substantially a short circuit with reference to high frequency energy attempting to propagate through the window 13 and along the major axis of the enclosure 10 so that a device connected to the right-hand extremity of the switch will be protected from the receipt of such energy. Assuming such a device to be a receiver, the utility of this operation will be readily understood from the preliminary discussion given in connection with Fig. 1.

In order further to assure the completeness of the switching function performed by the device 10, there may be provided a second set of opposed conical electrodes 30 and 31 displaced from the first set by approximately a quarter wave length at the intended operating frequency of the system, and constructed to be similar in all respects to the electrodes 15 and 16. In this latter connection, there is shown the externally projecting portion 33 of a conductor which is assumed to connect with a keep-alive electrode (not shown) contained within the electrode 31. In use, the electrodes 30 and 31 establish a tertiary discharge in parallel with the discharge occurring across the window 13 and that occurring between electrodes 15 and 16 so that the switching function of the device as a whole is accomplished with great effectiveness.

In the intended use of the device (e. g., in an arrangement corresponding to that of Fig. 1), it is important that the space within the device be returned to wholly unconductive condition very promptly, that is, within a few microseconds of the discontinuance of the sustaining electric field. The attainment of this condition depends upon the ability of the gaseous medium within the enclosure 10 to become deionized in extremely rapid fashion. However, it has been found in typical cases that the rate of deionization of the gases suitable for the purpose under consideration is undesirably slow so that various expedients, such as the addition of a small quantity of water vapor, have been resorted to to hasten the deionization process. The use of water vapor and similar vaporizable substances presents certain difficulties because of the tendency of such substances to disappear due to clean-up action during the continued operation of the switch. In connection with the present invention, it has been found that material improvement in expediting the deionizing process can be obtained by including within the gas-filled space a discharge pervious mass of finely divided insulating material.

In a particular case glass wool has been found to represent an excellent embodiment of the invention, and in Fig. 2 a quantity of this material, indicated at 35, is represented as being present in the space between the wall member 11 and the electrodes 15 and 16 and also as extending between the last-named electrodes. It is found unnecessary to use this material in the space adjacent to the electrodes 30 and 31 because of the fact that the ionization in the vicinity of such electrodes is relatively slight in any event. However, the insulating substance may be extended throughout the entire enclosure if this is desired.

While I desire not to be bound to any particular theory of explanation of the success of the invention, it has been suggested that electrons attach themselves to the surfaces of the insulating medium and attract positive ions for ready recombination with negative electrons. Disposition of the attractive surfaces throughout the gas volume results in its rapid deionization when the original cause of ionization is removed.

Consistent with this viewpoint and also consistent with the results obtained in practice, it is considered desirable to use a material having as high a ratio of surface area to solid volume as possible. In general, it is believed that the interfiber or interparticle spacing should be on the order of an ionic free path. Glass wool is commercially available having fibers of a uniform diameter of around .00004 inch. Packing of the wool to an average density of .02 gram per cubic centimeter results in some 5 miles of fibers spaced on the average of .0004 inch apart with 360 square centimeters of surface area per cubic centimeter of wool used. This is found to be very satisfactory in practice.

In a particular case in which observations were based upon a switch filled with argon at a pressure corresponding to several millimeters of mercury, it has been noted that the recovery time (i. e., time required to reach the point at which high frequency attenuation due to residual ionization is reduced to 6 decibels) is decreased by the use of the invention from 50 microseconds, to 18 microseconds, and further improvement with optimum arrangements may reasonably be expected. In lieu of glass wool, quartz wool or other ceramic wools of similar properties may be employed. Moreover, the invention is not limited to thread-like substances or to ceramic materials since other finely divided inert insulating materials suspended in a discharge pervious arrangement may be used. A specific alternative to the fibrous substances proposed is silica aerogel, this being a silica water gel dehydrated in such a way that capillary volumes remain uncollapsed after the removal of water, creating a very large ratio of surface area to solid volume.

The application of the invention is not limited to electronic TR switches but is considered to extend to other gaseous discharge devices in which rapid deionization may be important. For example, the invention is considered useful in connection with thyratrons (controlled gaseous discharge devices) where intended for use in circuits requiring off-on operation at a very high rate of speed. Fig. 5, for example, shows a partially sectionalized view representing the essential elements of the thyratron embodying the invention.

In this figure there is shown a glass envelope 40 containing an anode 41, a cathode 42 and a control element or grid 43. The control electrode comprises a metal cylinder 43 surrounding the discharge space between the anode and cathode and includes an apertured metal diaphragm 44 interposed between the anode and cathode. An externally accessible terminal 45 is provided for the anode 41, and lead-in conductors 46 to 48, inclusive, are provided for the cathode and grid respectively. A filamentary heater 49 is indicated in connection with the cathode. It is assumed that the envelope 40 contains an ionizable medium such as a fixed gas (e. g., argon or neon) or a substance such as mercury which vaporizes to produce an ionizable gas.

With the combination of elements so far described, the occurrence of a favorable potential between the electrodes 41 and 42 and the application of a correspondingly favorable potential to the control electrode 44 will permit ionization of the gaseous operating medium to occur with a resultant high intensity discharge through the device. With the cessation of the discharge-producing potentials, a specific minimum time is required before the grid can be said to have regained control to such an extent that the occurrence of a further discharge can be exclusively controlled by its action, the length of the interval being a function of the rate of deionization of the gas contained in the envelope 40. In line with the explanation previously given herein, the deionization period may be materially shortened by interposing in the space between the anode 41 and the apertured grid partition 44 a quantity of finely divided discharge pervious insulating material, for example, glass wool, as indicated at 51. The effect of this material is identical with that described in connection with Fig. 2.

A still further use of the invention is in connection with the so-called Geiger-Mueller counter which also depends for its utility in certain applications upon the possibility of securing rapid deionization of a contained gas. The inclusion of a finely divided insulating material in such a device in a manner consistent with my invention will extend its usefulness.

While the invention has been described by reference to particular embodiments, it is obvious that further arrangements and applications will occur to those skilled in the art, and I, therefore, aim in the appended claims to cover all such equivalent variations as come within the true spirit and scope of the foregoing description.

What I claim as new and desire to secure by Letters Patent of the United States is:

1. An electronic discharge device comprising an enclosing envelope, an anode, a cathode and a control electrode in spaced relationship within said envelope, an ionizable gas within the envelope for supporting an ionized discharge therein when favorable potentials are applied to said anode, cathode and control electrode, and a discharge-pervious mass of finely divided inert insulating material in the space between said anode and control electrode capable of increasing the rate of deionization upon termination of a discharge through the device.

2. An electronic discharge device comprising an enclosing envelope, an anode, cathode, and control electrode in spaced relationship within said envelope, an ionizable gas within the envelope, and a discharge-pervious mass of fibrous ceramic insulating material in the space between the said anode and control electrode.

3. A discharge device according to claim 2 in which the fibrous material consists of glass wool.

4. An electronic control device having a rapid time of conversion from its conductive to nonconductive state including an ionizable gas to facilitate movement of charges and including a mass of silica aerogel in contact with said gas capable of increasing the deionization rate of the gas.

5. An electric discharge device adapted to be used in high frequency electromagnetic wave systems comprising spaced discharge electrodes, and ionizable gas filling the space between said electrodes for facilitating the passage of an electrical discharge between them, and a mass of finely divided inert insulating material in contact with said gas capable of increasing its rate of deionization, said electrodes being closely spaced to permit the formation of said electric discharge between them by electromagnetic waves.

6. An electric control device comprising an enclosure including a conductive member adapted to form a uniform continuation of a wave guide in which said device may be inserted, an ionizable gas within said enclosure to facilitate movement of charges and including a mass of finely divided siliceous material in contact with said gas capable of increasing the deionization rate of the gas.

7. An electric discharge device comprising an enclosure substantially bounded on four sides by a continuous conductive member, an ionizable gas to facilitate movement of charges and including a mass of loosely packed filaments of inert insulating material capable of increasing the deionization rate of said gas.

8. An electronic switching device comprising an enclosure including a metallic member substantially covering four of its six sides, an ionizable gas within said enclosure to facilitate movement of charges and a mass of glass wool in contact with said gas.

9. An electrical switching device comprising an enclosing envelope, an ionizable gas within said envelope, spaced electrodes for producing an electric discharge through said gas, said electrodes being conductively connected to form a short circuit, and a mass of finely divided inert insulating material occupying the interelectrode space in extensive surface contact with said gas and capable of increasing its rate of deionization.

10. An electric discharge device comprising an enclosing envelope, means defining a discharge gap within said envelope, said means being a continuously conductive member, a quantity of argon providing an ionizable medium within said envelope to facilitate a discharge across said gap, and a quantity of finely divided siliceous material in the form of loosely packed fibers extending into said gas for increasing the rate of deionization of the said gas.

11. An electronic control device having a rapid time of conversion from its conductive to non-conductive state comprising an enclosing envelope, means defining a discharge gap within said envelope, said means including a conductive member extending over substantially four sides of said device, an ionizable gaseous atmosphere within said envelope and a mass of finely divided inert insulating material in contact with said atmosphere and capable of increasing the deionization rate of the gas comprising said atmosphere.

12. An electronic discharge device comprising an enclosing envelope, a pair of primary electrodes in spaced relationship within said envelope, said electrodes conductively connected by a metallic member integral with said envelope, an ionizable gas within the envelope for facilitating passage of a discharge between said electrodes, a mass of finely divided inert insulating material disposed within said enclosure and capable of increasing the deionization rate of said gas, an auxiliary electrode adjacent one of said primary electrodes and insulated therefrom for producing a keep-alive arc in said device.

MILAN D. FISKE.

REFERENCES CITED

The following references are of record in the file of this patent:

UNITED STATES PATENTS

| Number | Name | Date |
|---|---|---|
| 2,073,715 | Stone | Mar. 16, 1937 |
| 2,133,205 | McCauley | Oct. 11, 1938 |
| 2,400,456 | Haine et al. | May 14, 1946 |
| 2,415,962 | Okress | Feb. 18, 1947 |
| 2,445,445 | Marcum | July 20, 1948 |